US012500345B2

(12) United States Patent
Yang et al.

(10) Patent No.: US 12,500,345 B2
(45) Date of Patent: Dec. 16, 2025

(54) DUAL-POLARIZED ANTENNA AND ELECTRONIC DEVICE

(71) Applicants: Beijing BOE Sensor Technology Co., Ltd., Beijing (CN); BOE Technology Group Co., Ltd., Beijing (CN)

(72) Inventors: Xiaoqiang Yang, Beijing (CN); Wei Zhao, Beijing (CN); Lu Chen, Beijing (CN); Yiming Wang, Beijing (CN); Mengjiao Li, Beijing (CN); Zhifeng Zhang, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 64 days.

(21) Appl. No.: 18/635,140

(22) Filed: Apr. 15, 2024

(65) Prior Publication Data

US 2024/0347915 A1 Oct. 17, 2024

Related U.S. Application Data

(63) Continuation of application No. PCT/CN2023/087719, filed on Apr. 12, 2023.

(51) Int. Cl.
*H01Q 9/04* (2006.01)
*H01P 1/18* (2006.01)

(52) U.S. Cl.
CPC ........... *H01Q 9/0435* (2013.01); *H01P 1/182* (2013.01)

(58) Field of Classification Search
None
See application file for complete search history.

(56) References Cited

U.S. PATENT DOCUMENTS 10,298,336 B1 5/2019 Tabatabai et al.
11,139,544 B2 * 10/2021 Wiegner ............... H01P 1/2039
11,817,628 B2 * 11/2023 Lee ........................ H01Q 21/26

FOREIGN PATENT DOCUMENTS

CN 107887694 A 4/2018
CN 109932845 A 6/2019
(Continued)

OTHER PUBLICATIONS

PCT/CN2023/087719 international search report dated Oct. 23, 2023.

*Primary Examiner* — Crystal L Hammond
(74) *Attorney, Agent, or Firm* — IPro, PLLC

(57) ABSTRACT

Provided is a dual-polarized antenna. The dual-polarized antenna includes: a radiation structure, a first feeder, a second feeder, a first phase-shifting structure, a second phase-shifting structure, and a third phase-shifting structure, wherein the first phase-shifting structure is electrically connected to the radiation structure via the first feeder, the second phase-shifting structure is electrically connected to the radiation structure via the second feeder, and a feed direction of the first feeder is different from a feed direction of the second feeder; and the first phase-shifting structure and the second phase-shifting structure both are electrically connected to the third phase-shifting structure and both are disposed on different layers with the third phase-shifting structure, and a maximum phase-shifting degree of the first phase-shifting structure and a maximum phase-shifting degree of the second phase-shifting structure both are less than a maximum phase-shifting degree of the third phase-shifting structure.

20 Claims, 14 Drawing Sheets

(56) References Cited

FOREIGN PATENT DOCUMENTS

| | | | |
|---|---|---|---|
| CN | 110120585 | A | 8/2019 |
| CN | 113629404 | A | 11/2021 |

* cited by examiner

DUAL-POLARIZED ANTENNA AND ELECTRONIC DEVICE

CROSS-REFERENCE TO RELATED APPLICATION

This application is a continuation application of international application No. PCT/CN2023/087719, filed on Apr. 12, 2023, the disclosure of which is herein incorporated by reference in its entirety.

TECHNICAL FIELD

The present disclosure relates to the field of communication technologies, in particular to a dual-polarized antenna and an electronic device.

BACKGROUND

Shifters, as important devices for antennas, are determined as delay lines. A phase-tunable shifter is acquired by replacing a traditional solid base substrate with a tunable dielectric material, and the liquid crystal is a tunable dielectric material. A liquid crystal shifter is the phase-tunable shifter. An overlap capacitance is formed by loading a voltage on upper and lower substrates in the liquid crystal shifter, such that a dielectric constant of the liquid crystal material changes, and hence a phase constant of the electromagnetic wave in the device changes. Thus, an effect of tuning the phase-shifting degree is achieved, and a wavenumber scanning function of the antenna device is achieved.

SUMMARY

Some embodiments of the present disclosure provide a dual-polarized antenna. The dual-polarized antenna includes: a radiation structure, a first feeder, a second feeder, a first phase-shifting structure, a second phase-shifting structure, and a third phase-shifting structure; wherein the first phase-shifting structure is electrically connected to the radiation structure via the first feeder, the second phase-shifting structure is electrically connected to the radiation structure via the second feeder, and a feed direction of the first feeder is different from a feed direction of the second feeder; and the first phase-shifting structure and the second phase-shifting structure both are electrically connected to the third phase-shifting structure and both are disposed on different layers with the third phase-shifting structure, and a maximum phase-shifting degree of the first phase-shifting structure and a maximum phase-shifting degree of the second phase-shifting structure both are less than a maximum phase-shifting degree of the third phase-shifting structure.

In some embodiments, the third phase-shifting structure includes a first dielectric substrate and a second dielectric substrate that are opposite to each other, a first tunable dielectric layer disposed between the first dielectric substrate and the second dielectric substrate, a first electrode layer disposed on a side, close to the first tunable dielectric layer, of the first dielectric substrate, and a second electrode layer disposed on a side, close to the first tunable dielectric layer, of the second dielectric substrate, wherein the first phase-shifting structure and the second phase-shifting structure both are disposed on a side, facing away from the first dielectric substrate, of the second dielectric substrate.

In some embodiments, the first phase-shifting structure is a phase-fixed shifter, and the second phase-shifting structure is a phase-tunable shifter.

In some embodiments, the second phase-shifting structure includes a third dielectric substrate and a fourth dielectric substrate that are opposite to each other, a second tunable dielectric layer disposed between the third dielectric substrate and the fourth dielectric substrate, a third electrode layer disposed on a side, close to the fourth dielectric substrate, of the third dielectric substrate, and a fourth electrode layer disposed on a side, close to the third dielectric substrate, of the fourth dielectric substrate, wherein the third phase-shifting structure is disposed on a side, facing away from the fourth dielectric substrate, of the third dielectric substrate.

In some embodiments, a position relationship of the second phase-shifting structure and the first phase-shifting structure is any one of:

the first phase-shifting structure being disposed between the third dielectric substrate of the second phase-shifting structure and the third phase-shifting structure;

the first phase-shifting structure being disposed on a side, facing away from the third dielectric substrate, of the fourth dielectric substrate of the second phase-shifting structure;

the first phase-shifting structure and the third electrode layer of the second phase-shifting structure being disposed on a same layer; and the first phase-shifting structure and the fourth electrode layer of the second phase-shifting structure being disposed on a same layer.

In some embodiments, the first phase-shifting structure is a phase delay line.

In some embodiments, the phase delay line and the first feeder are disposed on a same layer.

In some embodiments, a maximum phase-shifting degree of a third shifter is 360°, a phase-shifting degree of a first shifter is 90°, and a phase-shifting degree of a second shifter is 180°.

In some embodiments, the first phase-shifting structure and the second phase-shifting structure are phase-fixed shifters, and phase-shifting degrees of the first phase-shifting structure and the second phase-shifting structure are different.

In some embodiments, the third phase-shifting structure, the first phase-shifting structure, and the second phase-shifting structure are sequentially laminated, or the third phase-shifting structure, the second phase-shifting structure, and the first phase-shifting structure are sequentially laminated.

In some embodiments, a maximum phase-shifting degree of a third shifter is 360°, a phase-shifting degree of a first shifter is 90°, and a maximum phase-shifting degree of a second shifter is 180°.

In some embodiments, the first phase-shifting structure and the second phase-shifting structure are phase-tunable shifters.

In some embodiments, the first phase-shifting structure includes a fifth dielectric substrate and a sixth dielectric substrate that are opposite to each other, a third tunable dielectric layer disposed between the fifth dielectric substrate and the sixth dielectric substrate, a fifth electrode layer disposed on a side, close to the sixth dielectric substrate, of the fifth dielectric substrate, and a sixth electrode layer disposed on a side, close to the fifth dielectric substrate, of the sixth dielectric substrate; and the second phase-shifting structure includes a third dielectric substrate and a fourth dielectric substrate that are opposite to each other, a second tunable dielectric layer disposed between the third dielectric substrate and the fourth dielectric substrate, a third electrode layer disposed on a side, close to the fourth dielectric substrate, of the third dielectric substrate, and a fourth electrode layer disposed on a side, close to the third dielectric substrate, of the fourth dielectric substrate; wherein the third dielectric substrate and the fifth dielectric substrate are of an integrated structure, the fourth dielectric substrate and the sixth dielectric substrate are of an integrated structure, the second tunable dielectric layer and the third tunable dielectric layer are of an integrated structure, the third electrode layer and the fifth electrode layer are disposed on a same layer, and the fourth electrode layer and the sixth electrode layer are disposed on a same layer; and wherein the third phase-shifting structure is disposed on a side, facing away from the fourth dielectric substrate, of the third dielectric substrate.

In some embodiments, the first phase-shifting structure includes a fifth dielectric substrate and a sixth dielectric substrate that are opposite to each other, a third tunable dielectric layer disposed between the fifth dielectric substrate and the sixth dielectric substrate, a fifth electrode layer disposed on a side, close to the sixth dielectric substrate, of the fifth dielectric substrate, and a sixth electrode layer disposed on a side, close to the fifth dielectric substrate, of the sixth dielectric substrate; and the second phase-shifting structure includes a third dielectric substrate and a fourth dielectric substrate that are opposite to each other, a second tunable dielectric layer disposed between the third dielectric substrate and the fourth dielectric substrate, a third electrode layer disposed on a side, close to the fourth dielectric substrate, of the third dielectric substrate, and a fourth electrode layer disposed on a side, close to the third dielectric substrate, of the fourth dielectric substrate; wherein wherein the fifth dielectric substrate is disposed on a side, facing away from the third dielectric substrate, of the fourth dielectric substrate, and the third phase-shifting structure is disposed on a side, facing away from the fourth dielectric substrate, of the third dielectric substrate; or wherein the third dielectric substrate is disposed on a side, facing away from the fifth dielectric substrate, of the sixth dielectric substrate, and the third phase-shifting structure is disposed on a side, facing away from the sixth dielectric substrate, of the fifth dielectric substrate.

In some embodiments, a maximum phase-shifting degree of a third shifter is 360°, a maximum phase-shifting degree of a first shifter is 90°, and a maximum phase-shifting degree of a second shifter is 90°.

In some embodiments, the dual-polarized antenna further includes: a feed structure electrically connected to the first phase-shifting structure.

In some embodiments, the radiation structure is a radiation patch.

Some embodiments of the present disclosure further provide an electronic device. The electronic device includes the antenna in any of the above embodiments.

DETAILED DESCRIPTION

For clearer descriptions of the objects, technical solutions, and advantages of the embodiments of present disclosure, the present disclosure is described in detail hereinafter in combination with the accompanying drawings and the specific embodiments of the present disclosure.

Unless otherwise defined, technical or scientific terms used in the present disclosure shall have ordinary meaning understood by persons of ordinary skill in the art to which the disclosure belongs. The terms "first," "second," and the like used in the embodiments of the present disclosure are not intended to indicate any order, quantity or importance, but are merely used to distinguish the different components. The articles "a," "an," and "the" are not intended to limit the quantity, and only represent that at least one exists. The terms "comprise" or "include" and the like are used to indicate that the element or object preceding the terms covers the element or object following the terms and its equivalents, and shall not be understood as excluding other elements or objects. The terms "connect" or "contact" and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly.

In the fields such as satellite communications and the like, an antenna supporting two different polarization types is generally required. The current liquid crystal antenna requires two corresponding 360° shifters in one antenna, and an arrangement of two shifters is difficult to achieve limited by the limited design space and cross coupling of the shifters.

Figure 1:
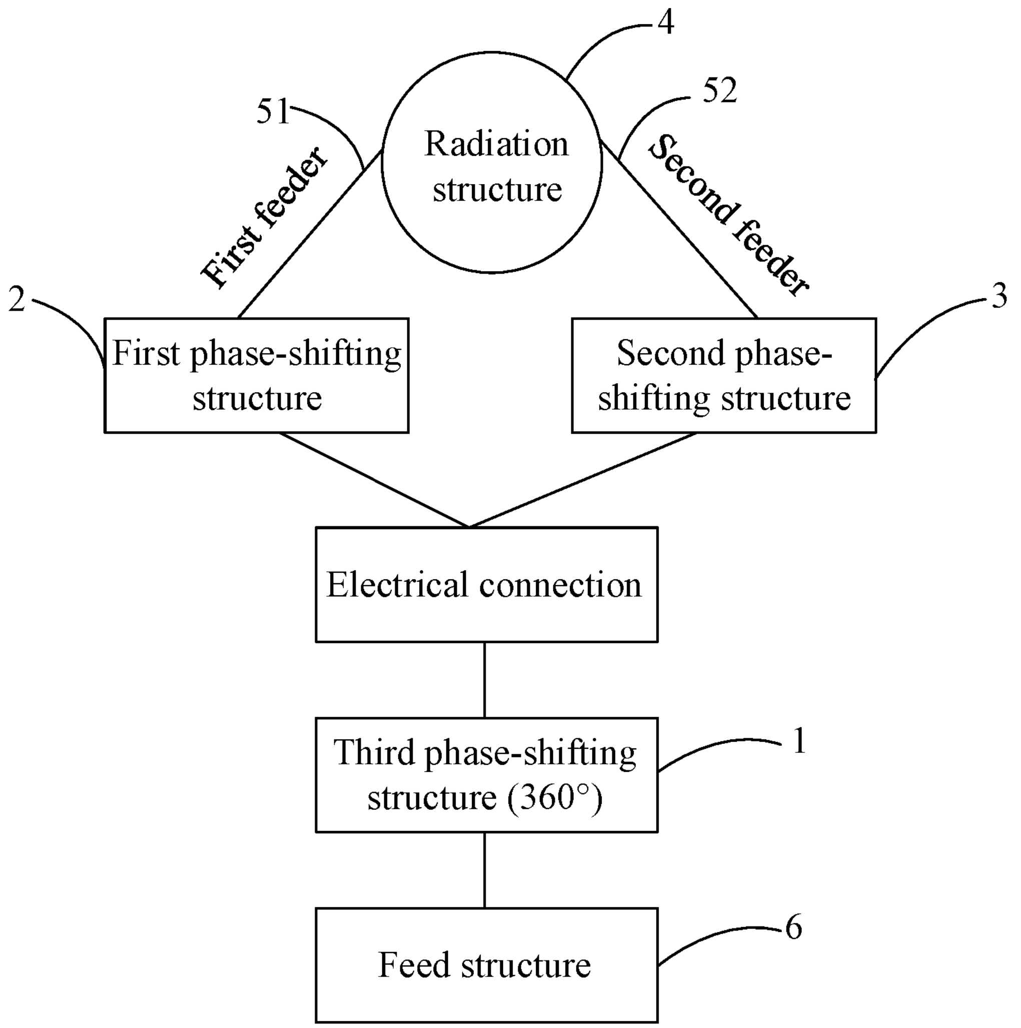
FIG. 1 is a schematic structural diagram of a dual-polarized antenna according to some embodiments of the present disclosure.

In a first aspect, FIG. 1 is a schematic structural diagram of a dual-polarized antenna according to some embodiments of the present disclosure. As shown in FIG. 1, the embodiments of the present disclosure provide a dual-polarized antenna. The dual-polarized antenna includes a radiation structure 4, a first feeder 51, a second feeder 52, a first phase-shifting structure 2, a second phase-shifting structure 3, and a third phase-shifting structure 1. The first phase-shifting structure 2 is electrically connected to the radiation structure 4 via the first feeder 51, the second phase-shifting structure 3 is electrically connected to the radiation structure 4 via the second feeder 52, and a first feed structure 6 and a second feed structure 6 are connected to a third phase-shifting structure 1. In the embodiments of the present disclosure, the first phase-shifting structure 2 and the second phase-shifting structure 3 are disposed on different layers with the third phase-shifting structure 1, and a maximum phase-shifting degree of the first phase-shifting structure 2 and a maximum phase-shifting degree of the second phase-shifting structure 3 both are less than a maximum phase-shifting degree of the third phase-shifting structure 1.

It should be noted that in the embodiments of the present disclosure, the dual-polarized antenna not only includes the above structures, but also includes a feed structure 6 electrically connected to the third phase-shifting structure 1. The dual-polarized antenna is an emitting antenna or a receiving antenna, or a transceiver antenna.

In the case that the dual-polarized antenna achieves emission of the electromagnetic wave, the feed structure 6 feeds the electromagnetic wave to the third phase-shifting structure 1, the third phase-shifting structure 1 performs the phase shift on the microwave signal, the phase-shifted microwave signal is fed to the first phase-shifting structure 2 and the second phase-shifting structure 3, the first phase-shifting structure 2 feeds the electromagnetic wave to the radiation structure 4 via the first feeder 51, and the second phase-shifting structure 3 feeds the electromagnetic wave to the radiation structure 4 via the second feeder 52. As the feed direction of the first feeder 51 is different from the feed direction of the second feeder 52, the electromagnetic waves with two polarization directions are combined. In addition, waveforms of the combined electromagnetic wave are switched by controlling the phase-shifting degrees of the first phase-shifting structure 2 and the second phase-shifting structure 3.

In the case that the dual-polarized antenna achieves receival of the electromagnetic wave, the electromagnetic wave received by the radiation structure 4 is decomposed to two linear polarized electromagnetic waves. One of the two linear polarized electromagnetic waves is transmitted to the first phase-shifting structure 2 via the first feeder 51, and the other of the two linear polarized electromagnetic waves is transmitted to the second phase-shifting structure 3 via the second feeder 52. The electromagnetic waves transmitted by the first phase-shifting structure 2 and the second phase-shifting structure 3 are combined and transmitted to the feed structure 6 upon being phase-shifted by a third phase-shifting unit. In addition, waveforms of the combined electromagnetic wave are switched by controlling the phase-shifting degrees of the first phase-shifting structure 2 and the second phase-shifting structure 3.

In the embodiments of the present disclosure, the third phase-shifting structure 1 is a phase-tunable shifter with a maximum phase-shifting degree of 360°, and the first phase-shifting structure 2 and the second phase-shifting structure 3 are phase-tunable shifters or phase-fixed shifters. For example, in the case that the dual-polarized antenna operates, a difference in the phase-shifting degrees of the first phase-shifting structure 2 and the second phase-shifting structure 3 is controlled to be 90°, that is, the phase of the electromagnetic wave shifted the first phase-shifting structure 2 is 90° ahead or behind the phase of the electromagnetic wave shifted the second phase-shifting structure 3. In this case, the two linear polarized waves combine the circular polarized wave, and the polarization direction of the circular polarization is tunable.

In the embodiments of the present disclosure, as the maximum phase-shifting degree of the first phase-shifting structure 2 and the maximum phase-shifting degree of the second phase-shifting structure 3 both are less than the maximum phase-shifting degree of the third phase-shifting structure 1, that is, a size of the first phase-shifting structure 2 and a size of the second phase-shifting structure 3 both are less than a size of the third phase-shifting structure 1, the space of the first phase-shifting structure 2 and the second phase-shifting structure 3 is less, and the dual-polarized antenna is facilitated to be achieved.

Figure 2:
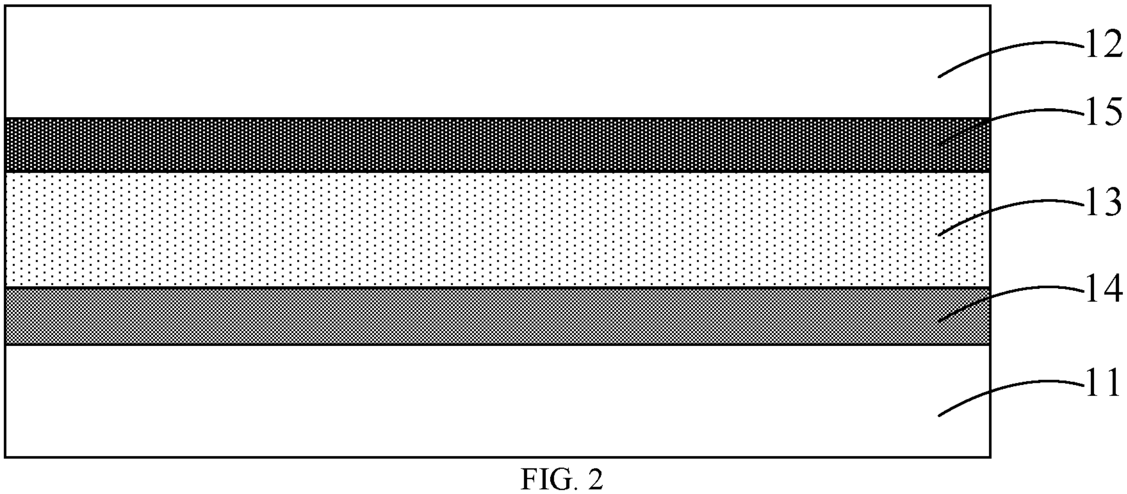
FIG. 2 is a section view of a third phase-shifting structure in a dual-polarized antenna according to some embodiments of the present disclosure.

In some embodiments, FIG. 2 is a section view of a third phase-shifting structure 1 in a dual-polarized antenna according to some embodiments of the present disclosure. As shown in FIG. 2, the third phase-shifting structure 1 includes a first dielectric substrate 11 and a second dielectric substrate 12 that are opposite to each other, a first tunable dielectric layer 13 disposed between the first dielectric substrate 11 and the second dielectric substrate 12, a first electrode layer 14 disposed on a side, close to the first tunable dielectric layer 13, of the first dielectric substrate 11, and a second electrode layer 15 disposed on a side, close to the first tunable dielectric layer 13, of the second dielectric substrate 12. The first tunable dielectric layer is at least partially disposed on an overlapped region of orthographic projections of the first electrode layer 14 and the second electrode layer 15 on the first dielectric substrate 11. In the case that a bias voltage is supplied on the first electrode layer 14 and the second electrode layer 15, and an electric field is formed between the first electrode layer 14 and the second electrode layer 15, the dielectric constant of the first tunable dielectric layer changes, such that the phase of the electromagnetic wave signal is tuned. The first phase-shifting structure 2, the second phase-shifting structure 3, and the radiation structure 4 are disposed on a side, facing away from the first dielectric substrate 11, of the second dielectric substrate 12.

Specifically, the third phase-shifting structure 1 is a liquid crystal shifter, that is, the first tunable dielectric layer 13 is made of liquid crystal molecules. In the embodiments of the present disclosure, the first tunable dielectric layer 13 is not limited to be made of the liquid crystal molecules, and any material with the dielectric constant changeable under the action of the electric field can be used as the material of the first tunable dielectric layer 13 in the embodiments of the present disclosure.

The first electrode layer 14 includes a signal electrode, and the second electrode layer 15 includes a plurality of patch electrodes juxtaposed in an extension direction of the signal electrode. An orthographic projection of each patch electrode on the first dielectric substrate 11 is overlapped with an orthographic projection of the signal electrode on the first dielectric substrate 11. In this case, the first phase-shifting structure 2 and the second phase-shifting structure 3 are combined to be electrically connected to one end of the signal electrode, and the other end of the signal electrode is electrically connected to the feed structure. It should be noted that the first electrode layer 14 being the signal electrode and the second electrode layer 15 being the patch electrode are an exemplary structure, and the first electrode layer 14 is any transmission line structure, such as the coplanar waveguides transmission line, and the like in actual products, which are not illustrated herein.

In the embodiments of the present disclosure, the first phase-shifting structure 2 and the second phase-shifting structure 3 are disposed on the same layer or different layers. The following descriptions illustrate the dual-polarized antenna in the embodiments of the present disclosure in conjunction with several specific examples. It should be further noted that the following descriptions illustrate by taking the dual-polarized antenna achieving the circular polarization as an example, and the dual-polarized antenna in the embodiments of the present disclosure is not limited to achieving the circular polarization. It can be understood that the polarization in other directions can be achieved by controlling the phase-shifting degrees of the first phase-shifting structure 2 and the second phase-shifting structure 3.

Figure 3:
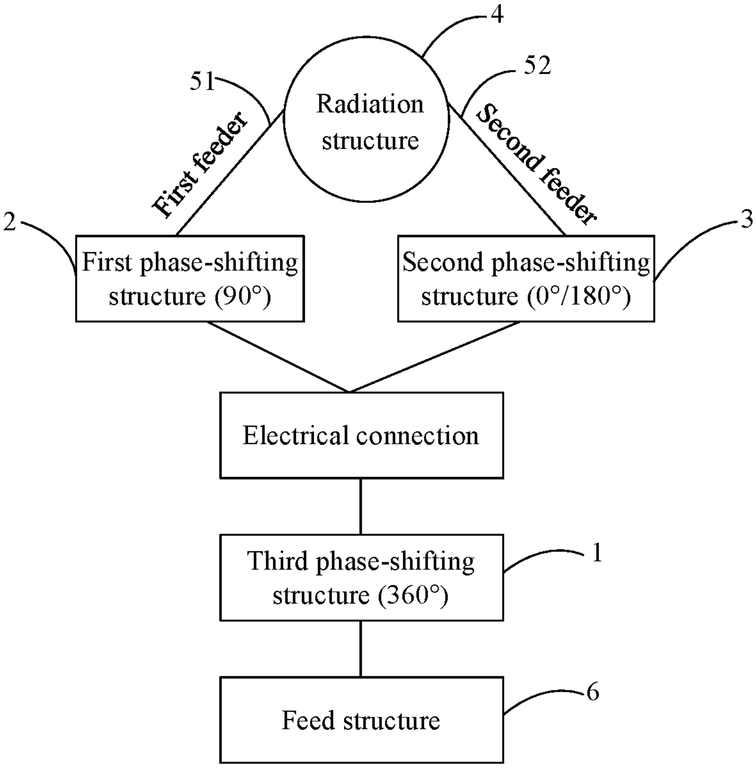
FIG. 3 is a schematic structural diagram of a dual-polarized antenna in a first example according to some embodiments of the present disclosure.
Figure 4:
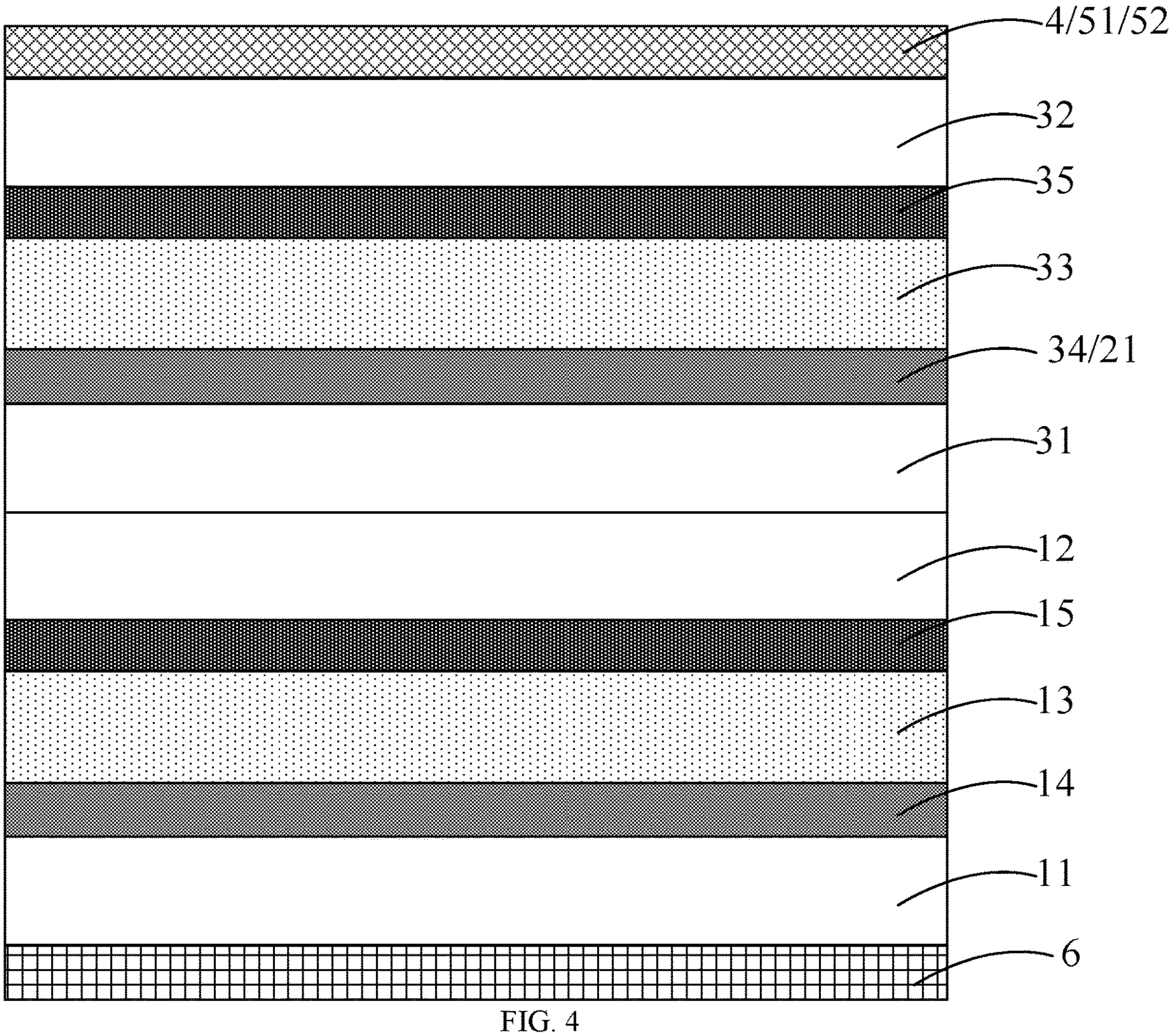
FIG. 4 is a first section view of a dual-polarized antenna in a first example according to some embodiments of the present disclosure.

In a first example, FIG. 3 is a schematic structural diagram of a dual-polarized antenna in a first example according to some embodiments of the present disclosure. FIG. 4 is a first section view of a dual-polarized antenna in a first example according to some embodiments of the present disclosure. As shown in FIG. 3 and FIG. 4, in the example, the first phase-shifting structure 2 and the second phase-shifting structure 3 are laminated on the third phase-shifting structure 1, and the first phase-shifting structure 2 and the second phase-shifting structure 3 are disposed on the same layer. The feed structure 6 is disposed on a side, facing away from the first phase-shifting structure 2/the second phase-shifting structure 3, of the third phase-shifting structure 1. The first phase-shifting structure 2 is a phase-fixed shifter, and the second phase-shifting structure 3 is a phase-tunable shifter. For example, the first phase-shifting structure 2 is a 90° phase-fixed shifter, and the maximum phase-shifting degree of the second phase-shifting structure 3 is 180°. Specifically, the second phase-shifting structure 3 is a 0°/180° phase-tunable shifter. In this case, the tunable polarization of the circular polarization, that is, the left-hand circular polarization or right-hand circular polarization, is achieved by controlling the phase of the second phase-shifting structure 3 to be 0° or 180°.

It should be noted that the same layer of the first phase-shifting structure 2 and the second phase-shifting structure 3 indicates that partial film layers of the first phase-shifting structure 2 and the second phase-shifting structure 3 are disposed on the same layer or the film layers of the first phase-shifting structure 2 and the second phase-shifting structure 3 are respectively disposed on the same layer.

Specifically, the second phase-shifting structure 3 includes a third dielectric substrate 31 and a fourth dielectric substrate 32 that are opposite to each other, a second tunable dielectric layer 33 disposed between the third dielectric substrate 31 and the fourth dielectric substrate 32, a third electrode layer 34 disposed on a side, close to the second tunable dielectric layer 33, of the third dielectric substrate 31, and a fourth electrode layer 35 disposed on a side, close to the second tunable dielectric layer 33, of the fourth dielectric substrate 32. The second tunable dielectric layer 33 is at least partially disposed on an overlapped region of orthographic projections of the third electrode layer 34 and the fourth electrode layer 35 on the first dielectric substrate 11. In the case that a bias voltage is supplied on the third electrode layer 34 and the fourth electrode layer 35, and an electric field is formed between the third electrode layer 34 and the fourth electrode layer 35, the dielectric constant of the second tunable dielectric layer 33 changes, such that the phase of the electromagnetic wave signal is tuned.

Specifically, the second phase-shifting structure 3 is a liquid crystal shifter, that is, the second tunable dielectric layer 33 is made of liquid crystal molecules. In the embodiments of the present disclosure, the material of the second tunable dielectric layer 33 is not limited to the liquid crystal molecules, and any material with the dielectric constant changeable under the action of the electric field can be used as the material of the second tunable dielectric layer 33 in the embodiments of the present disclosure.

The third electrode layer 34 and the above first electrode layer 14 are of the same structure, that is, the third electrode layer 34 includes the signal electrode. The fourth electrode layer 35 and the above second electrode layer 15 are of the same structure, that is, the fourth electrode layer 35 includes a plurality of patch electrodes juxtaposed in an extension direction of the signal electrode. An orthographic projection of each patch electrode on the first dielectric substrate 11 is overlapped with an orthographic projection of the signal electrode on the first dielectric substrate 11.

Furthermore, the first phase-shifting structure 2 is a delay line 21. The delay line 21 is disposed on the third dielectric substrate 31 or the fourth dielectric substrate 32. For example, the delay line is disposed on the third dielectric substrate 31, and the delay line and the third electrode layer 34 are disposed on the same layer. In the case that the third electrode layer 34 uses the signal electrode, one end of the delay line 21 is connected to the first feeder 51, and the other end of the delay line 21 is directly connected to the signal electrode used as the third electrode layer 34. In this case, the first phase-shifting structure 2 and the second phase-shifting structure 3 are combined, and the combined first phase-shifting structure 2 and second phase-shifting structure 3 is electrically connected to the third phase-shifting structure 1.

Furthermore, in the case that the third phase-shifting structure 1 uses the above liquid crystal shifter, the third dielectric substrate 31 in the second phase-shifting structure 3 is disposed on the side, facing away from the first dielectric substrate 11, of the second dielectric substrate 12, and the signal electrode of the second phase-shifting structure 3 is connected to the delay line of the first phase-shifting structure 2. In this case, the connection position of the signal electrode and the delay line is coupled to the signal electrode of the third phase-shifting structure 1, or a connection structure 71 is disposed between the third dielectric substrate 31 and the second dielectric substrate 12. In this case, the signal electrode of the second phase-shifting structure 3 is connected to the delay line of the first phase-shifting structure 2 and then extends through the via in the third dielectric substrate 31 to be connected to the connection structure 71, and the connection structure 71 extends through the via in the second dielectric substrate 12 to be connected to the signal electrode of the third phase-shifting structure 1.

Figure 5:
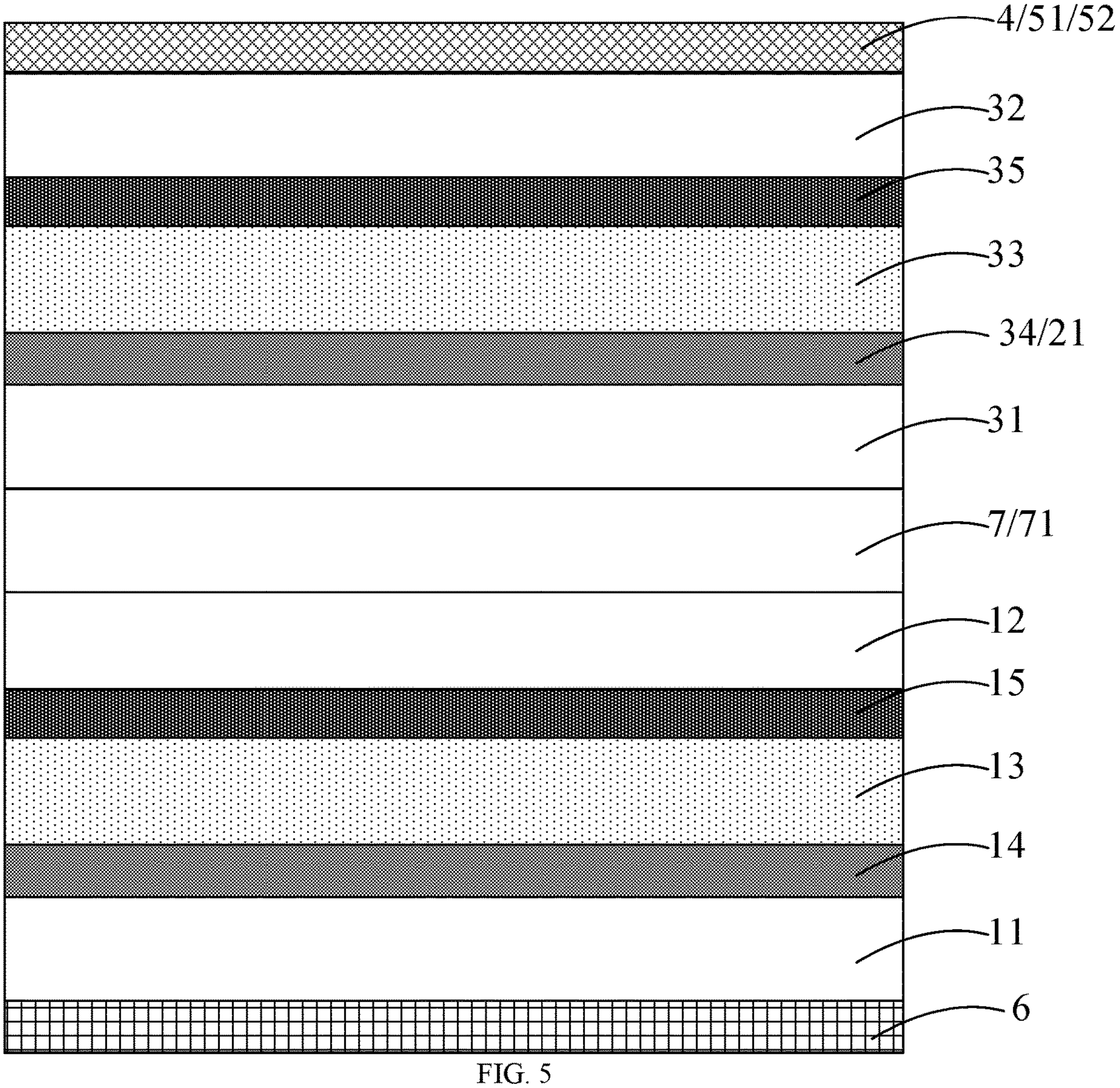
FIG. 5 is a second section view of a dual-polarized antenna in a first example according to some embodiments of the present disclosure.

FIG. 5 is a second section view of a dual-polarized antenna in a first example according to some embodiments of the present disclosure. As shown in FIG. 5, the connection structure 71 is a connection electrode between the second dielectric substrate 12 and the third dielectric substrate 31. Alternatively, the connection structure 71 is formed on the connection substrate 70, and the connection substrate 70 is formed between the second dielectric substrate 12 and the third dielectric substrate 31.

Figure 6:
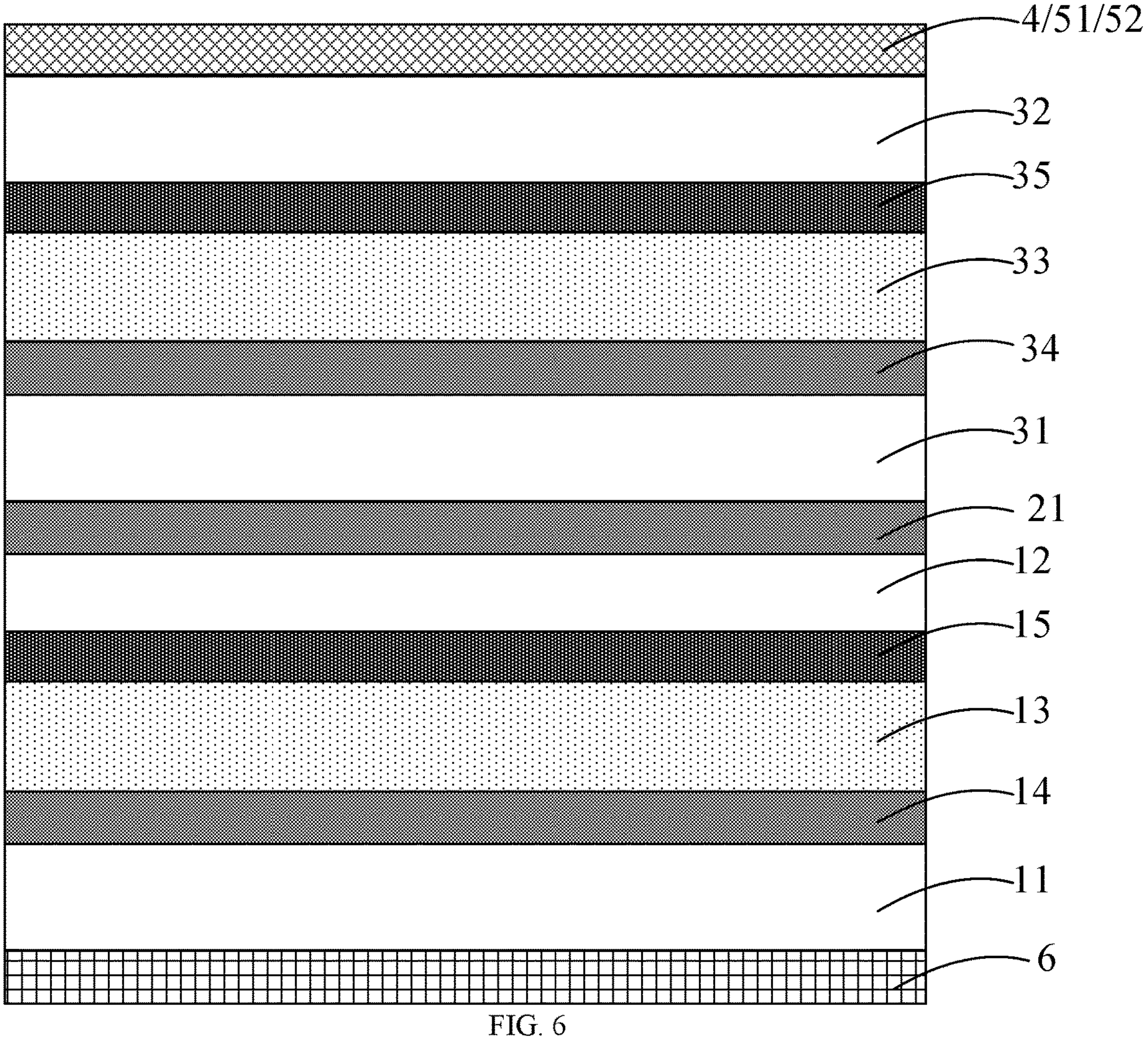
FIG. 6 is a third section view of a dual-polarized antenna in a first example according to some embodiments of the present disclosure.

In some embodiments, FIG. 6 is a third section view of a dual-polarized antenna in a first example according to some embodiments of the present disclosure. As shown in FIG. 6, in the example, the first phase-shifting structure 2 and the second phase-shifting structure 3 are disposed in different layers, and the first phase-shifting structure 2 is closer to the third phase-shifting structure 1 than the second phase-shifting structure 3, or the second phase-shifting structure 3 is closer to the third phase-shifting structure 1 than the first phase-shifting structure 2. FIG. 6 illustrates by taking the first phase-shifting structure 2 being closer to the third phase-shifting structure 1 than the second phase-shifting structure 3 as an example. In this case, the delay line of the first phase-shifting structure 2 is disposed between the second dielectric substrate 12 and the third dielectric substrate 31. In some embodiments, the delay line of the first phase-shifting structure 2 is disposed on a single dielectric substrate.

Figure 7:
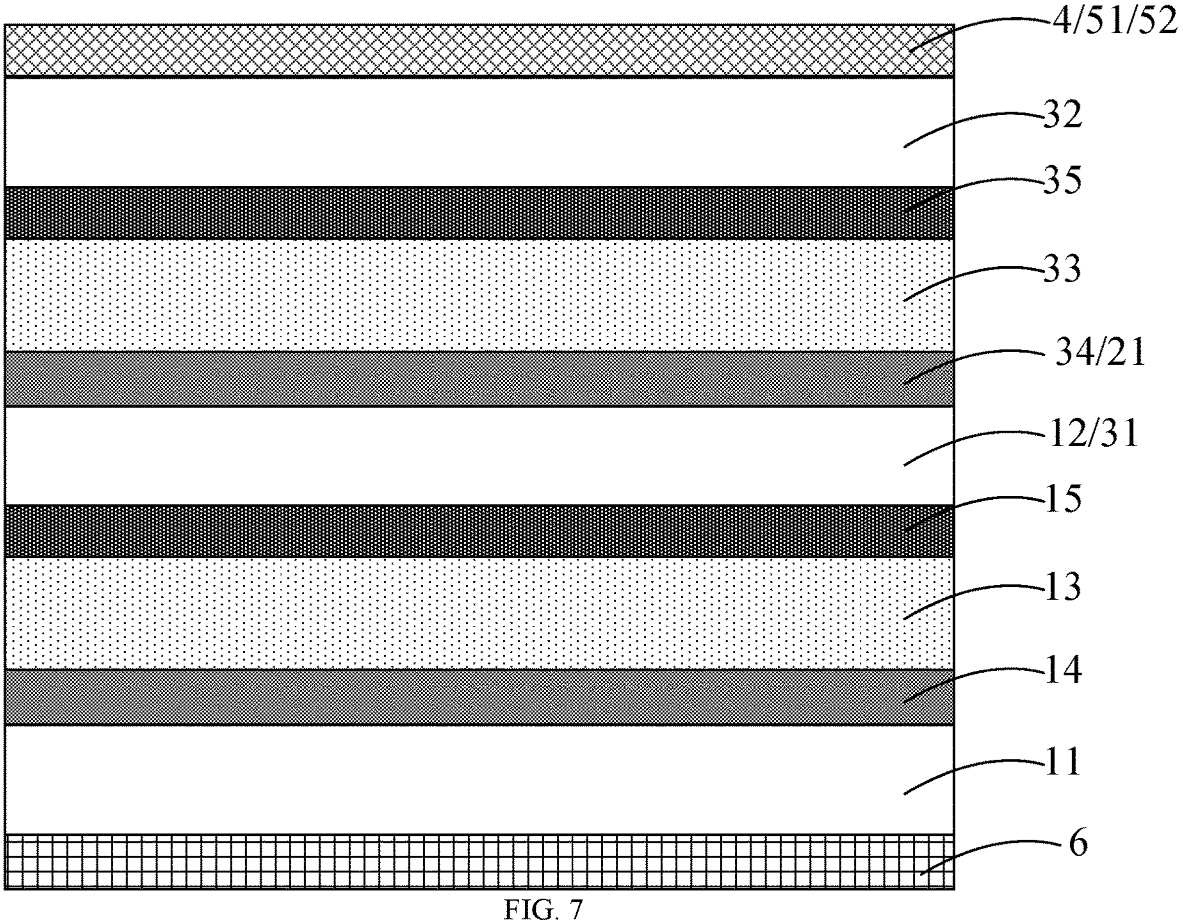
FIG. 7 is a fourth section view of a dual-polarized antenna in a first example according to some embodiments of the present disclosure.

In the example, FIG. 7 is a fourth section view of a dual-polarized antenna in a first example according to some embodiments of the present disclosure. As shown in FIG. 7, the second dielectric substrate 12 of the third phase-shifting structure 1 is shared as the third dielectric substrate 31 of the second phase-shifting structure 3. In this case, the second phase-shifting structure 3 and the third phase-shifting structure 1 only require three layers of dielectric substrate, such that the thinning of the antenna is achieved.

In the example, the radiation structure 4 is a radiation patch disposed on the third dielectric substrate 31 and/or the fourth dielectric substrate 32. Illustratively, the radiation patch is disposed on the third dielectric substrate 31, and the first feeder 51 and the second feeder 52 are also disposed on the third dielectric substrate 31. In addition, the radiation patch, the first feeder 51, the second feeder 52, the delay line 21 of the first phase-shifting structure 2, and the signal electrode of the second phase-shifting structure 3 are disposed on the same layer. In this case, the delay line 21 of the first phase-shifting structure 2 is connected to the first feeder 51, the first feeder 51 is connected to the radiation patch, the signal electrode of the second phase-shifting structure 3 is connected to the second feeder 52, and the second feeder 52 is connected to the radiation patch. The setting mode is helpful to the thinning of the antenna. Illustratively, the radiation patch, the first feeder 51, and the second feeder 52 are disposed on the fourth dielectric substrate 32, the first feeder 51 is coupled to the delay line 21 of the first phase-shifting structure 2, and the second feeder 52 is coupled to the signal electrode of the second phase-shifting structure 3. The radiation patch, the first feeder 51, and the second feeder 52 are disposed on a side, close to or away from the second tunable dielectric layer 33, of the fourth dielectric substrate 32.

Figure 8:
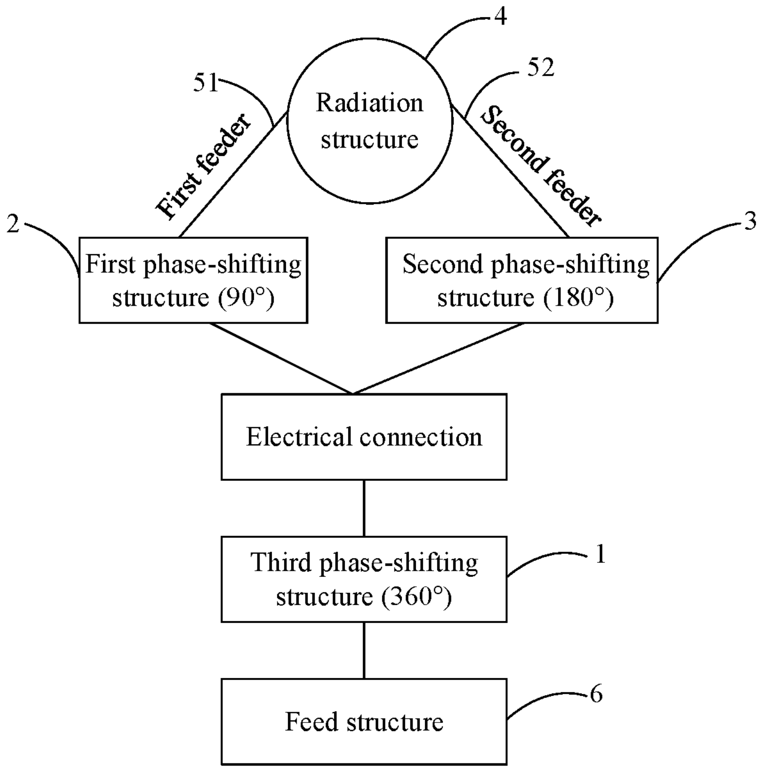
FIG. 8 is a schematic structural diagram of a dual-polarized antenna in a second example according to some embodiments of the present disclosure.

In a second example, FIG. 8 is a schematic structural diagram of a dual-polarized antenna in a second example according to some embodiments of the present disclosure. As shown in FIG. 8, the structure in the example and the structure in the first example are approximately the same and only differ in that the second phase-shifting structure 3 is a phase-fixed shifter, the first phase-shifting structure 2 is a 90° phase-fixed shifter, and the second phase-shifting structure 3 is a 180° phase-fixed shifter. In the example, the circular polarization of the dual-polarized antenna is achieved and is not tunable.

Figure 9:
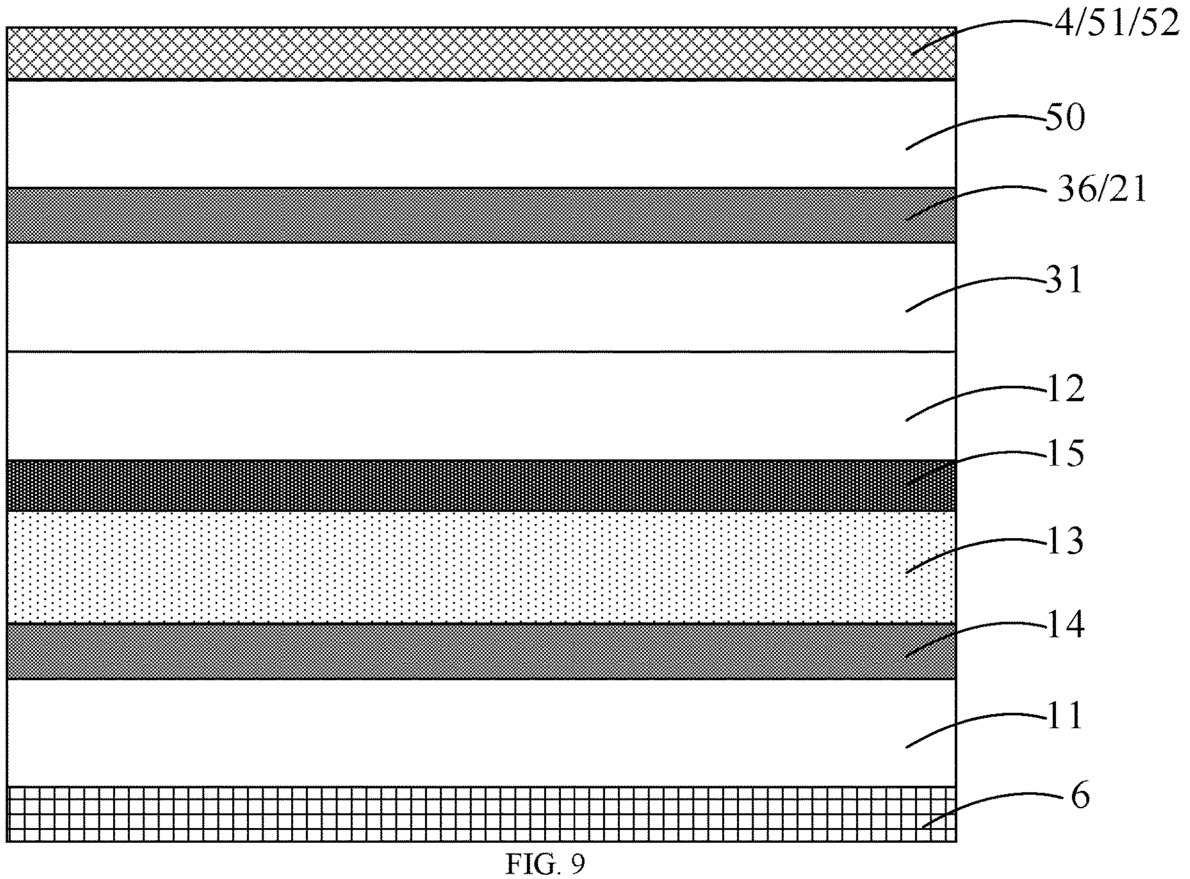
FIG. 9 is a first section view of a dual-polarized antenna in a second example according to some embodiments of the present disclosure.

In the example, FIG. 9 is a first section view of a dual-polarized antenna in a second example according to some embodiments of the present disclosure. As shown in FIG. 9, the first phase-shifting structure 2 and the second phase-shifting structure 3 both uses the delay line. In the case that the third phase-shifting structure 1 uses the above liquid crystal shifter, the delay line 21 of the first phase-shifting structure 2 and the delay line 36 of the second phase-shifting structure 3 both are disposed on the second dielectric substrate 12, for example, a side, facing away from the first dielectric substrate 11, of the second dielectric substrate 12. In some embodiments, the delay line of the first phase-shifting structure 2 and the delay line of the second phase-shifting structure 3 both are disposed on the third dielectric substrate 31, and the third dielectric substrate 31 is disposed on a side, facing away from the first dielectric substrate 11, of the second dielectric substrate 12. That is, the first phase-shifting structure 2 and the second phase-shifting structure 3 are disposed on the same layer. In this case, the radiation structure 4, the first feeder 51, and the second feeder 52 are disposed on the same layer as the first phase-shifting structure 2 and the second phase-shifting structure 3, the radiation structure 4 is connected to the first phase-shifting structure 2 via the first feeder 51 and to the second phase-shifting structure 3 via the second feeder 52, such that the thinning of the antenna is achieved. It should be noted that the radiation structure 4, the first feeder 51, and the second feeder 52 are disposed on the side, facing away from the third phase-shifting structure 1, of the first phase-shifting structure 2. For example, the radiation structure 4, the first feeder 51, and the second feeder 52 are disposed on a single dielectric substrate, and then the dielectric substrate is disposed on a side, facing away from the third dielectric substrate 31, of the first phase-shifting structure 2, such that the miniaturization of the antenna is achieved.

Figure 10:
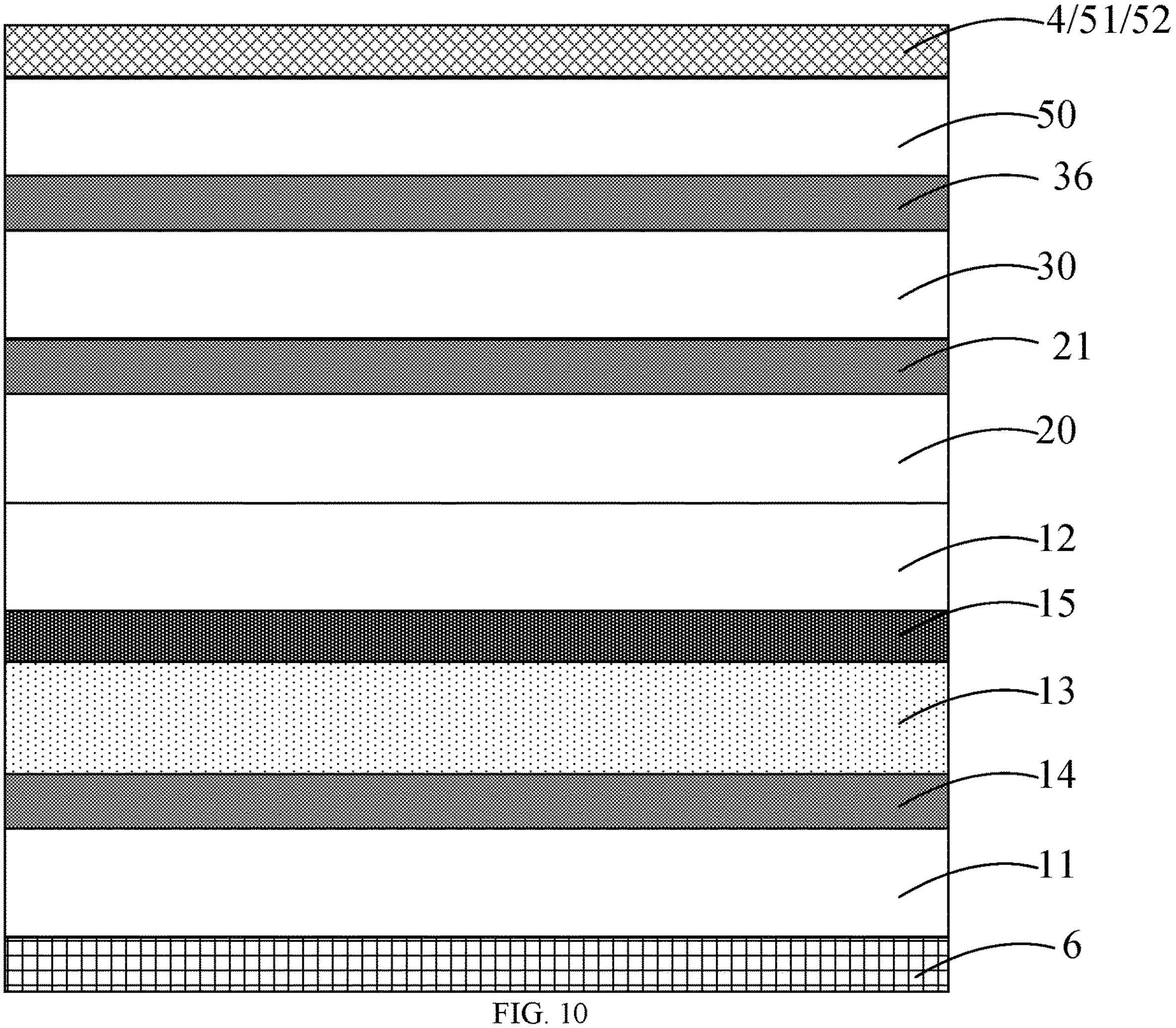
FIG. 10 is a second section view of a dual-polarized antenna in a second example according to some embodiments of the present disclosure.

In addition, the above structure is illustrated by taking the first phase-shifting structure 2 and the second phase-shifting structure 3 being disposed on the same layer as an example. FIG. 10 is a second section view of a dual-polarized antenna in a second example according to some embodiments of the present disclosure. As shown in FIG. 10, in some embodiments, the first phase-shifting structure 2 and the second phase-shifting structure 3 are laminated. That is, the delay line 21 of the first phase-shifting structure 2 and the delay line 36 of the second phase-shifting structure 3 are respectively disposed on a single dielectric substrate. Then, the dielectric substrate 20 provided with the delay line 21 is disposed on a side, facing away from the first dielectric substrate 11, of the second dielectric substrate 12, and the dielectric substrate 30 provided with the delay line 36 is disposed on a side, facing away from the dielectric substrate 20, of the delay line 21. It should be noted that in the embodiments of the present disclosure, the first phase-shifting structure 2 is closer to the third phase-shifting structure 1 than the second phase-shifting structure 3, or the second phase-shifting structure 3 is closer to the third phase-shifting structure 1 than the first phase-shifting structure 2. The accompany drawing shows the structure by taking the first phase-shifting structure 2 being closer to the third phase-shifting structure 1 than the second phase-shifting structure 3 as an example, which is not intend to limit the scope of the protection of the embodiments of the present disclosure.

Figure 11:
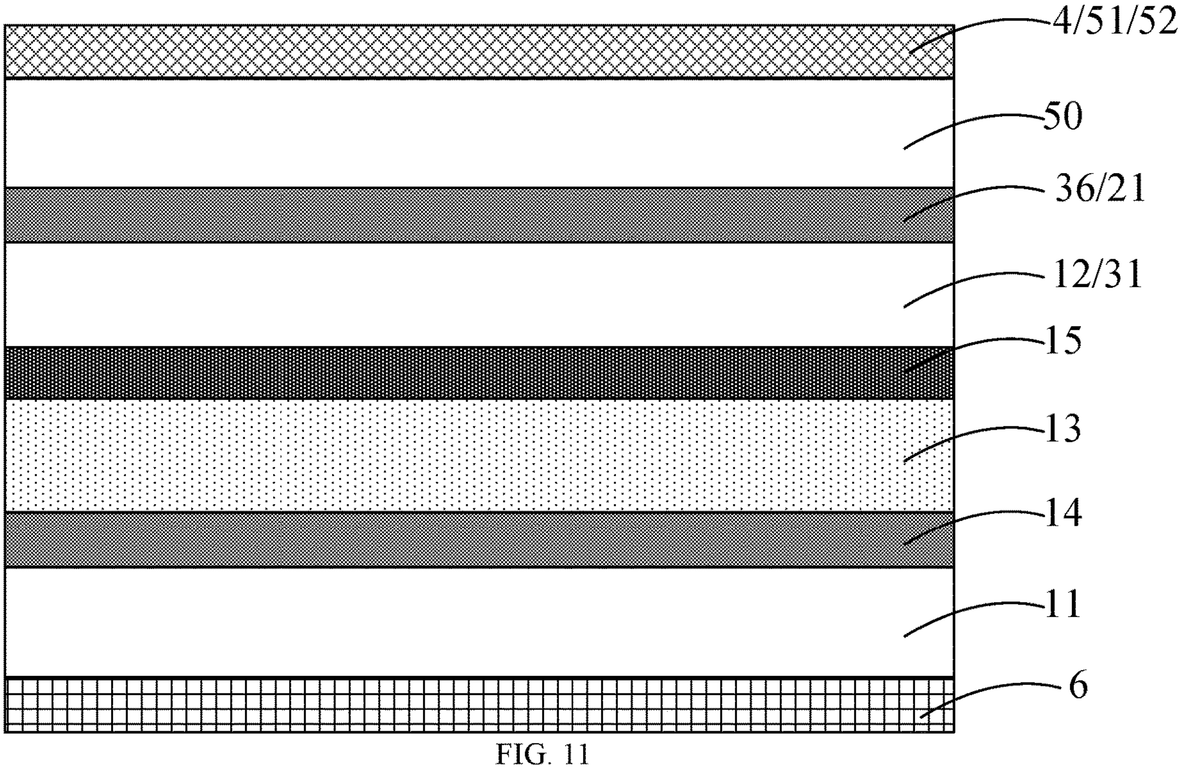
FIG. 11 is a third section view of a dual-polarized antenna in a second example according to some embodiments of the present disclosure.

FIG. 11 is a third section view of a dual-polarized antenna in a second example according to some embodiments of the present disclosure. As shown in FIG. 11, the third dielectric substrate 31 disposed with the delay line 21/36 is shared with the second dielectric substrate 12, such that the thinning of the antenna is achieved.

The remaining structures in the example are the structures in the first example, which are not repeated herein.

Figure 12:
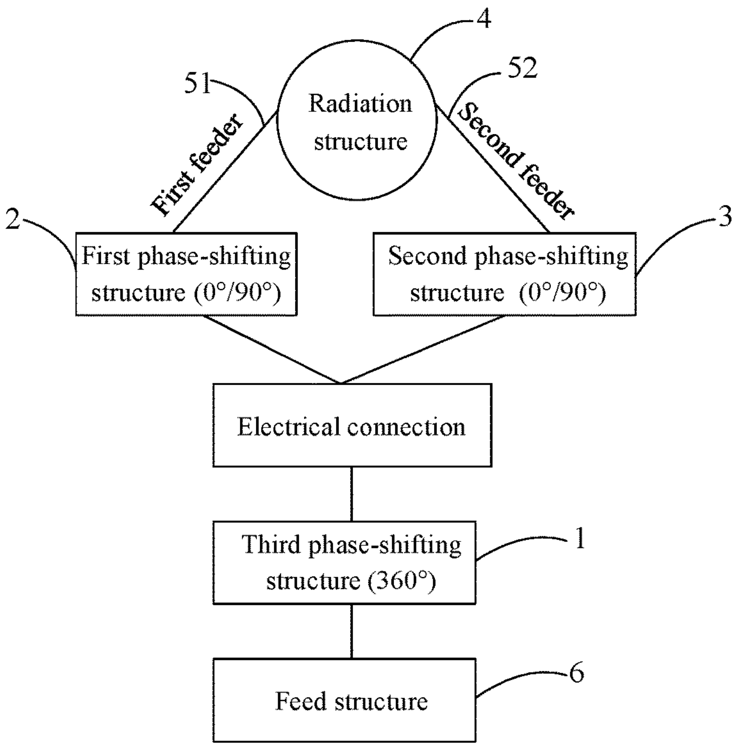
FIG. 12 is a schematic structural diagram of a dual-polarized antenna in a third example according to some embodiments of the present disclosure.

In a third example, FIG. 12 is a schematic structural diagram of a dual-polarized antenna in a third example according to some embodiments of the present disclosure. As shown in FIG. 12, in the example, the first phase-shifting structure 2 and the second phase-shifting structure 3 are phase-tunable shifters. For example, the maximum phase-shifting degree of the first phase-shifting structure 2 and the maximum phase-shifting degree of the second phase-shifting structure 3 are 90°. Specifically, the first phase-shifting structure 2 and the second phase-shifting structure 3 are 0°/90° phase-tunable shifters. In this case, the switch of the left-hand circular polarization, the right-hand circular polarization, and the linear polarization is achieved in the dual-polarized antenna by controlling the phase of the first phase-shifting structure 2 and the phase of the second phase-shifting structure 3. The remaining structures in the example are the structures in the first example.

Figure 13:
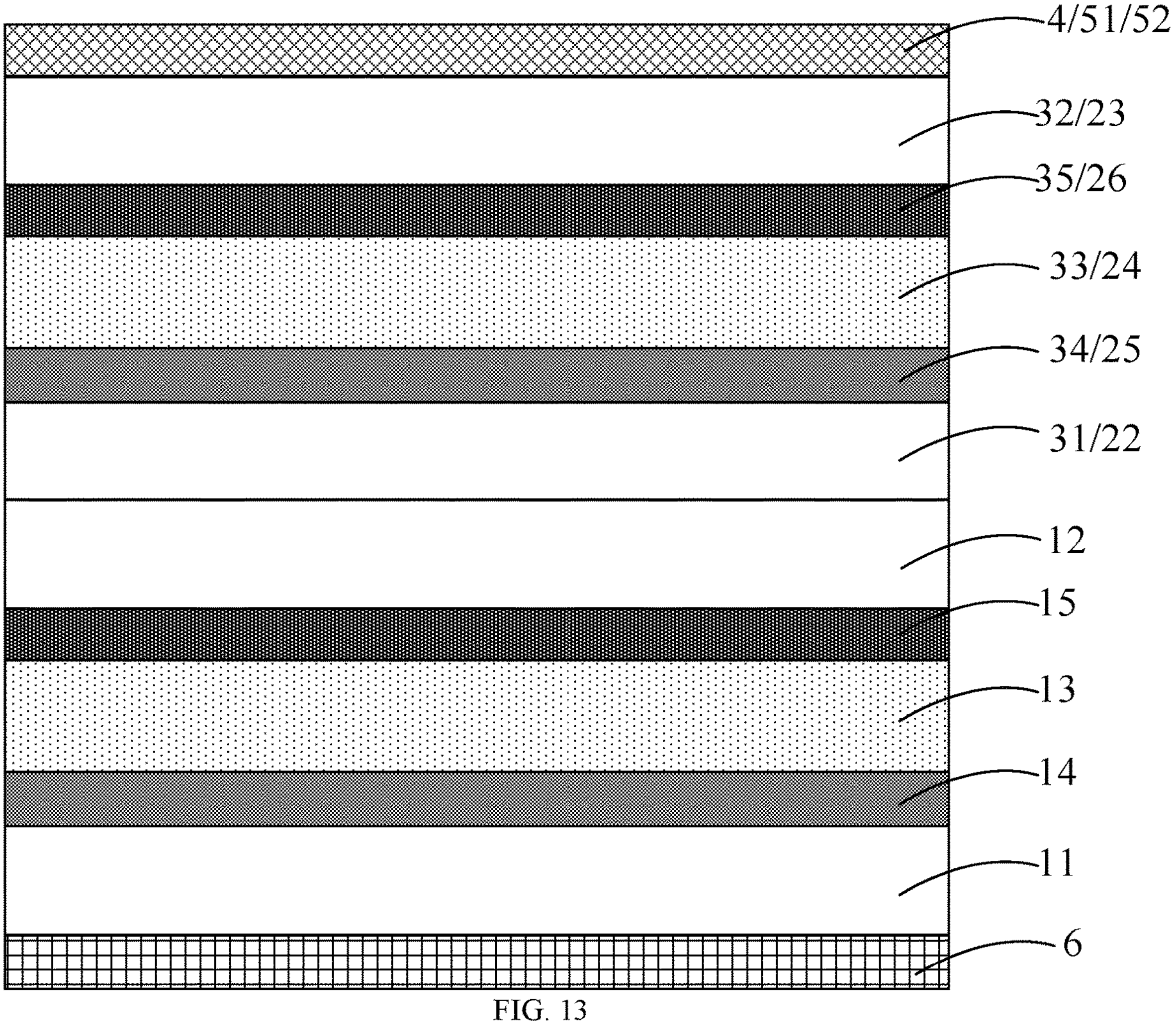
FIG. 13 is a first section view of a dual-polarized antenna in a third example according to some embodiments of the present disclosure.

Specifically, FIG. 13 is a first section view of a dual-polarized antenna in a third example according to some embodiments of the present disclosure. As shown in FIG. 13, the second phase-shifting structure 3 has the same structure as the above second phase-shifting structure 3. That is, the second phase-shifting structure 3 includes a third dielectric substrate 31 and a fourth dielectric substrate 32 that are opposite to each other, a second tunable dielectric layer 33 disposed between the third dielectric substrate 31 and the fourth dielectric substrate 32, a third electrode layer 34 disposed on a side, close to the second tunable dielectric layer 33, of the third dielectric substrate 31, and a fourth electrode layer 35 disposed on a side, close to the second tunable dielectric layer 33, of the fourth dielectric substrate 32. The second tunable dielectric layer 33 is at least partially disposed on an overlapped region of orthographic projections of the third electrode layer 34 and the fourth electrode layer 35 on the first dielectric substrate 11. In the case that a bias voltage is supplied on the third electrode layer 34 and the fourth electrode layer 35, and an electric field is formed between the third electrode layer 34 and the fourth electrode layer 35, the dielectric constant of the second tunable dielectric layer 33 changes, such that the phase of the electromagnetic wave signal is tuned.

Furthermore, the second phase-shifting structure 3 is a liquid crystal shifter, that is, the second tunable dielectric layer 33 is made of liquid crystal molecules. In the embodiments of the present disclosure, the material of the second tunable dielectric layer 33 is not limited to the liquid crystal molecules, and any material with the dielectric constant changeable under the action of the electric field can be used as the material of the second tunable dielectric layer 33 in the embodiments of the present disclosure.

With reference to FIG. 13, the first phase-shifting structure 2 includes a fifth dielectric substrate 22 and a sixth dielectric substrate 23 that are opposite to each other, a third tunable dielectric layer 24 disposed between the fifth dielectric substrate 22 and the sixth dielectric substrate 23, a fifth electrode layer 25 disposed on a side, close to the third tunable dielectric layer 24, of the fifth dielectric substrate 22, and a sixth electrode layer 26 disposed on a side, close to the third tunable dielectric layer 24, of the sixth dielectric substrate 23. The third tunable dielectric layer 24 is at least partially disposed on an overlapped region of orthographic projections of the fifth electrode layer 25 and the sixth electrode layer 26 on the fifth dielectric substrate 22. In the case that a bias voltage is supplied on the fifth electrode layer 25 and the sixth electrode layer 26, and an electric field is formed between the fifth electrode layer 25 and the sixth electrode layer 265, the dielectric constant of the third tunable dielectric layer 24 changes, such that the phase of the electromagnetic wave signal is tuned.

Furthermore, the third phase-shifting structure 1 is a liquid crystal shifter, that is, the third tunable dielectric layer 24 is made of liquid crystal molecules. In the embodiments of the present disclosure, the material of the third tunable dielectric layer 24 is not limited to the liquid crystal molecules, and any material with the dielectric constant changeable under the action of the electric field can be used as the material of the third tunable dielectric layer 24 in the embodiments of the present disclosure.

In some embodiments, as shown in FIG. 13, the first phase-shifting structure 2 and the second phase-shifting structure 3 are disposed on the same layer. In this case, the third dielectric substrate 31 and the fifth dielectric substrate 22 are of an integrated structure, the fourth dielectric substrate 32 and the sixth dielectric substrate 23 are of an integrated structure, the second tunable dielectric layer 33 and the third tunable dielectric layer 24 are of an integrated structure, the third electrode layer 34 and the fifth electrode layer 25 are disposed on a same layer, and the fourth electrode layer 35 and the sixth electrode layer 26 are disposed on a same layer. The second dielectric substrate 12 of the third phase-shifting structure 1 is disposed on a side, facing away from the fourth dielectric substrate 32, of the third dielectric substrate 31, such that the thinning of the antenna is achieved.

Figure 14:
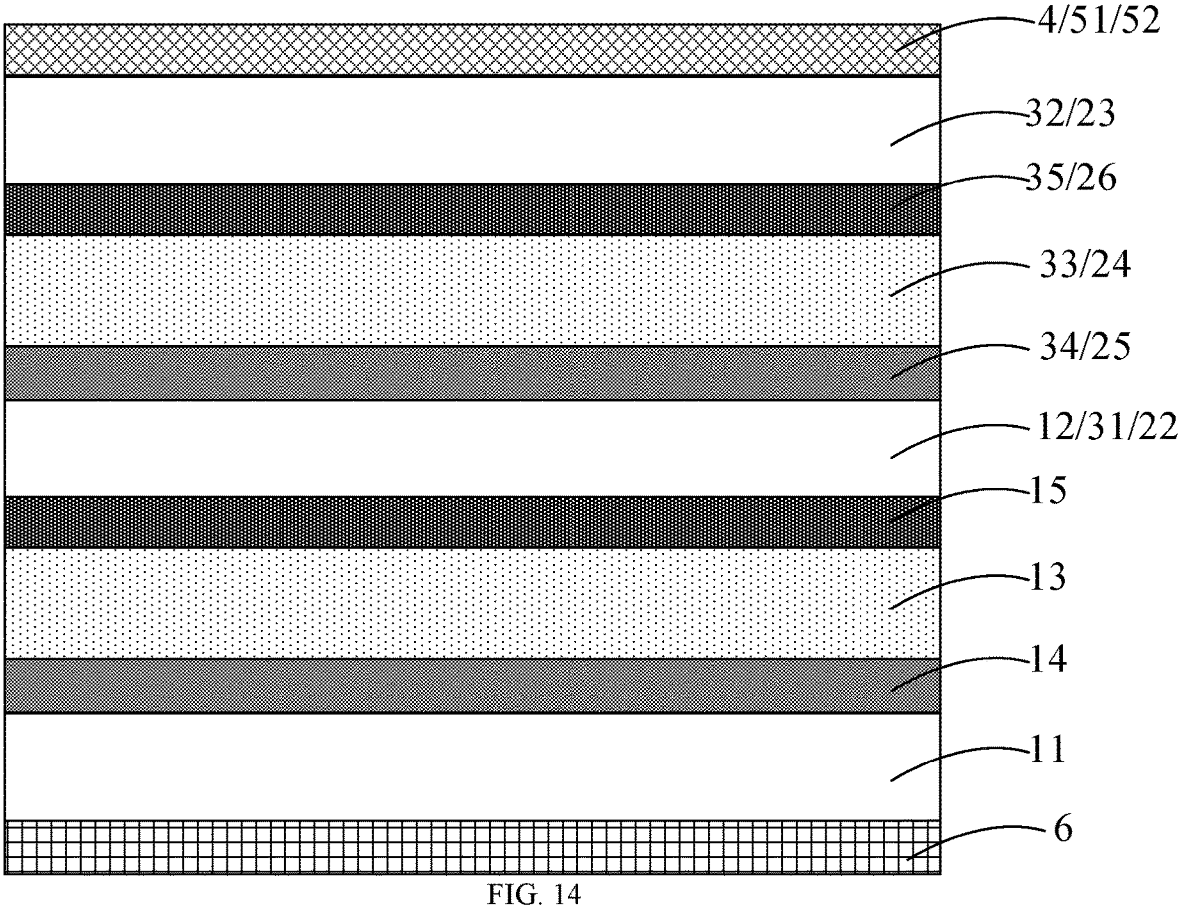
FIG. 14 is a second section view of a dual-polarized antenna in a third example according to some embodiments of the present disclosure.

Furthermore, as shown in FIG. 14, the second dielectric substrate 12 of the third phase-shifting structure 1 is shared as the fifth dielectric substrate 22 of the first phase-shifting structure 2/the third dielectric substrate 31 of the second phase-shifting structure 3, such that the thinning of the antenna is achieved.

Figure 15:
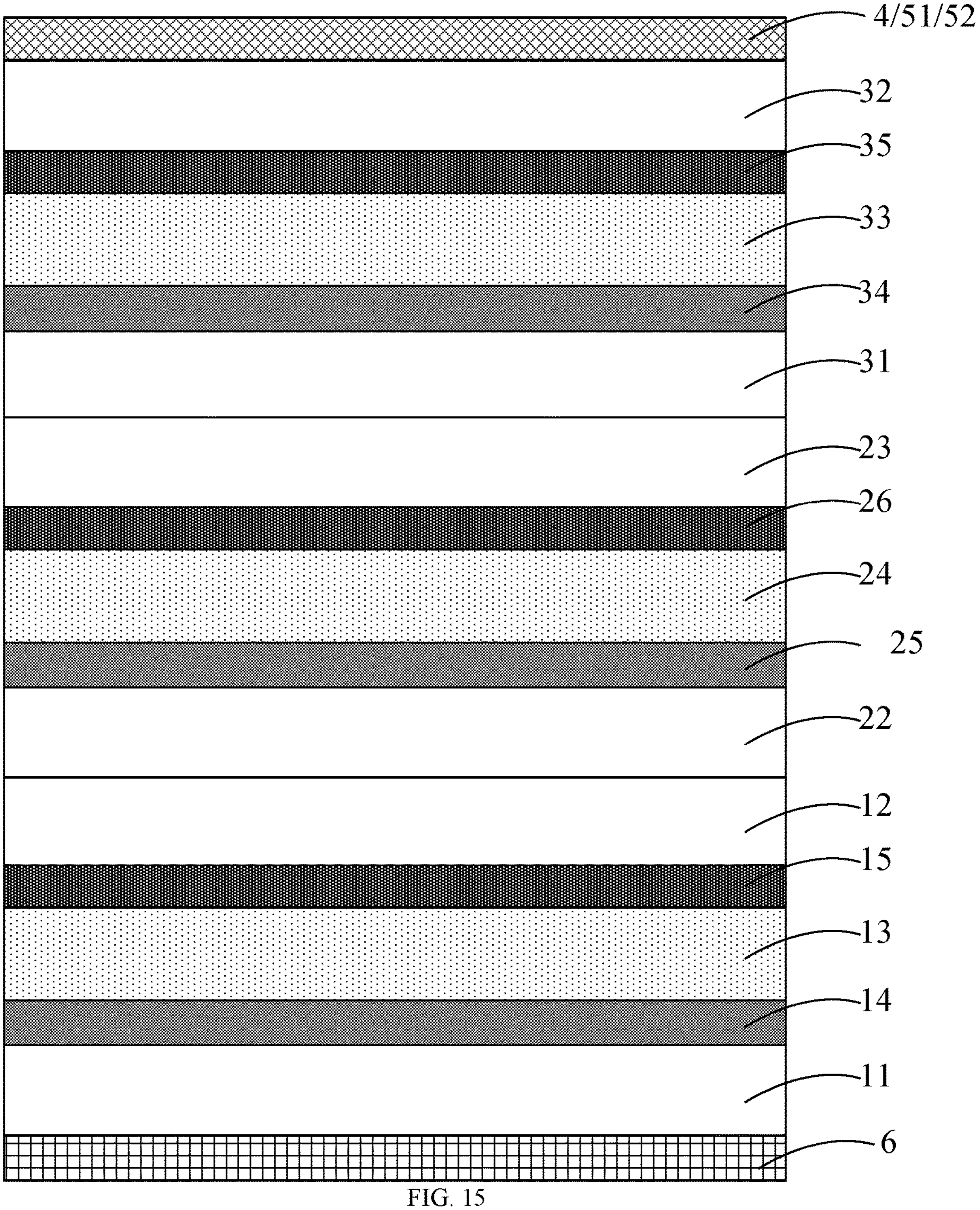
FIG. 15 is a third section view of a dual-polarized antenna in a third example according to some embodiments of the present disclosure.

In some embodiments, FIG. 15 is a third section view of a dual-polarized antenna in a third example according to some embodiments of the present disclosure. As shown in FIG. 15, the first phase-shifting structure 2 and the second phase-shifting structure 3 are laminated. In the case that the first phase-shifting structure 2 is closer to the third phase-shifting structure 1 than the second phase-shifting structure 3, the fifth dielectric substrate 22 of the first phase-shifting structure 2 is disposed on a side, facing away from the first dielectric substrate 11, of the second dielectric substrate 12 of the third phase-shifting structure 1, and the third dielectric substrate 31 of the second phase-shifting structure 3 is disposed on a side, facing away from the fifth dielectric substrate 22, of the sixth dielectric substrate 23 of the first phase-shifting structure 2, such that the miniaturization of the antenna is achieved. Similarly, in the case that the second phase-shifting structure 3 is closer to the third phase-shifting structure 1 than the first phase-shifting structure 2, the third dielectric substrate 31 of the second phase-shifting structure 3 is disposed on a side, facing away from the first dielectric substrate 11, of the second dielectric substrate 12 of the third phase-shifting structure 1, and the fifth dielectric substrate 22 of the first phase-shifting structure 2 is disposed on a side, facing away from the third dielectric substrate 31, of the fourth dielectric substrate 32 of the second phase-shifting structure 3.

Figure 16:
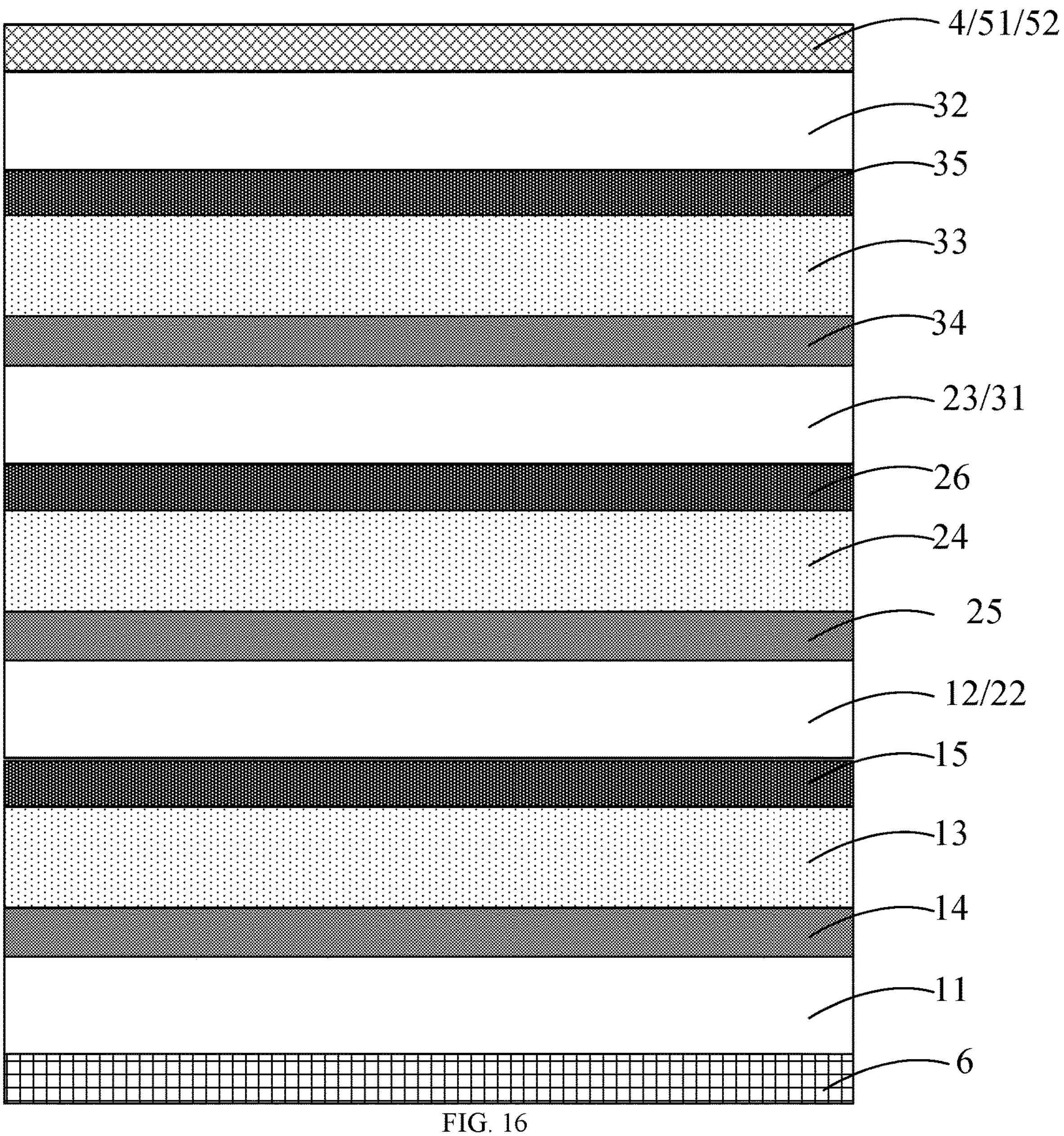
FIG. 16 is a fourth section view of a dual-polarized antenna in a third example according to some embodiments of the present disclosure.

Furthermore, FIG. 16 is a fourth section view of a dual-polarized antenna in a third example according to some embodiments of the present disclosure. As shown in FIG. 16, in the case that the first phase-shifting structure 2 is closer to the third phase-shifting structure 1 than the second phase-shifting structure 3, the second dielectric substrate 12 of the third phase-shifting structure 1 is shared as the fifth dielectric substrate 22 of the first phase-shifting structure 2, and the sixth dielectric substrate 23 of the first phase-shifting structure 2 is shared as the third dielectric substrate 31 of the second phase-shifting structure 3. In the case that the second phase-shifting structure 3 is closer to the third phase-shifting structure 1 than the first phase-shifting structure 2, the second dielectric substrate 12 of the third phase-shifting structure 1 is shared as the third dielectric substrate 31 of the second phase-shifting structure 3, and the fourth dielectric substrate 32 of the second phase-shifting structure 3 is shared as the fifth dielectric substrate 22 of the first phase-shifting structure 2, such that the thinning of the antenna is achieved.

In a second aspect, the embodiments of the present disclosure further provide an electronic device. The electronic device includes the holographic antenna according to any of the above embodiments. In some embodiments, the antenna further includes a transceiver unit, a radio frequency transceiver, a signal amplifier, a power amplifier, and a filter unit. The antenna is a sending antenna or a receiving antenna. The transceiver unit includes a base band and a receiving end. The base band provides at least one frequency band signal, such as the 2G signal, the 3G signal, the 4G signal, the 5G signal, and the like, and sends at least one frequency band signal to the radio frequency transceiver. Upon receiving the signal, the antenna in the communication system transmits the signal to the receiving end of the transceiver unit upon processing by the filter unit, the power amplifier, the signal amplifier, and the radio frequency transceiver, and the receiving end is a smart gateway.

Furthermore, the radio frequency transceiver is connected to the transceiver unit for modulating the signal sent by the transceiver unit or demodulating the signal received by the antenna and transmitting the signal back to the transceiver unit. Specifically, the radio frequency transceiver includes a transmitting circuit, a receiving circuit, a modulation circuit, and a demodulation circuit. After the transmitting circuit receives various types of signals provided by the baseband, the modulation circuit modulates various types of signals provided by the baseband and then sends to the antenna. The transparent antenna receives the signal and transmits to the receiving circuit of the radio frequency transceiver, the receiving circuit transmits the signal to the demodulation circuit, and the demodulation circuit demodulates the signal and then transmits to the receiving end.

Furthermore, the radio frequency transceiver is connected to the signal amplifier and the power amplifier, and the signal amplifier and the power amplifier are connected to the filter unit, and the filter unit is connected to at least one antenna. In sending signals by the communication system, the signal amplifier is used to improve the signal-to-noise ratio of the signals output by the radio frequency transceiver and then transmit to the filter unit. The power amplifier is used to amplify the power of the signal output by the radio frequency transceiver and then transmit to the filter unit. The filter unit specifically includes a duplexer and a filter circuit. The filter unit combines the signals output by the signal amplifier and the power amplifier, filters the noise wave and transmits to the transparent antenna, and the antenna radiates the signal. In receiving signals by the communication system, the antenna transmits the signals to the filter unit upon receiving the signals, and the filter unit filters the noise wave from the signals received by the antenna and transmits to the signal amplifier and the power amplifier, and the signal amplifier gains the signals received by the antenna to increase the signal-to-noise ratio of the signals. The power amplifier amplifies the power of the signal received by the antenna. The signal received by the antenna is processed by the power amplifier and signal amplifier and transmits to the radio frequency transceiver, and the radio frequency transceiver then transmits to the transceiver unit.

In some embodiments, the signal amplifier includes various types of signal amplifiers, such as a low noise amplifier, which is not limited herein.

In some embodiments, the antenna in the embodiments of the present disclosure further includes a power management unit, and the power management unit is connected to the power amplifier to provide the voltage with amplified signal for the power amplifier.

It can be understood that the above embodiments are exemplary embodiments for illustrating the principles of the present disclosure, and should not be construed as limiting the present disclosure. A person of ordinary skill in the art can obtain variations and improvements without departing from the spirit or essence of the present disclosure, the variations and improvements are within the scope of the protection of the present disclosure.

The invention claimed is:

1. A dual-polarized antenna, comprising: a radiation structure, a first feeder, a second feeder, a first phase-shifting structure, a second phase-shifting structure, and a third phase-shifting structure; wherein the first phase-shifting structure is electrically connected to the radiation structure via the first feeder, the second phase-shifting structure is electrically connected to the radiation structure via the second feeder, and a feed direction of the first feeder is different from a feed direction of the second feeder; and the first phase-shifting structure and the second phase-shifting structure both are electrically connected to the third phase-shifting structure and both are disposed on different layers with the third phase-shifting structure, and a maximum phase-shifting degree of the first phase-shifting structure and a maximum phase-shifting degree of the second phase-shifting structure both are less than a maximum phase-shifting degree of the third phase-shifting structure.

2. The dual-polarized antenna according to claim 1, wherein the third phase-shifting structure comprises a first dielectric substrate and a second dielectric substrate that are opposite to each other, a first tunable dielectric layer disposed between the first dielectric substrate and the second dielectric substrate, a first electrode layer disposed on a side, close to the first tunable dielectric layer, of the first dielectric substrate, and a second electrode layer disposed on a side, close to the first tunable dielectric layer, of the second dielectric substrate, wherein the first phase-shifting structure and the second phase-shifting structure both are disposed on a side, facing away from the first dielectric substrate, of the second dielectric substrate.

3. The dual-polarized antenna according to claim 1, wherein the first phase-shifting structure is a phase-fixed shifter, and the second phase-shifting structure is a phase-tunable shifter.

4. The dual-polarized antenna according to claim 3, wherein the second phase-shifting structure comprises a third dielectric substrate and a fourth dielectric substrate that are opposite to each other, a second tunable dielectric layer disposed between the third dielectric substrate and the fourth dielectric substrate, a third electrode layer disposed on a side, close to the fourth dielectric substrate, of the third dielectric substrate, and a fourth electrode layer disposed on a side, close to the third dielectric substrate, of the fourth dielectric substrate, wherein the third phase-shifting structure is disposed on a side, facing away from the fourth dielectric substrate, of the third dielectric substrate.

5. The dual-polarized antenna according to claim 4, wherein a position relationship of the second phase-shifting structure and the first phase-shifting structure is any one of:

the first phase-shifting structure being disposed between the third dielectric substrate of the second phase-shifting structure and the third phase-shifting structure;

the first phase-shifting structure being disposed on a side, facing away from the third dielectric substrate, of the fourth dielectric substrate of the second phase-shifting structure;

the first phase-shifting structure and the third electrode layer of the second phase-shifting structure being disposed on a same layer; and the first phase-shifting structure and the fourth electrode layer of the second phase-shifting structure being disposed on a same layer.

6. The dual-polarized antenna according to claim 3, wherein the first phase-shifting structure is a phase delay line.

7. The dual-polarized antenna according to claim 6, wherein the phase delay line and the first feeder are disposed on a same layer.

8. The dual-polarized antenna according to claim 3, wherein a maximum phase-shifting degree of a third shifter is 360°, a phase-shifting degree of a first shifter is 90°, and a maximum phase-shifting degree of a second shifter is 180°.

9. The dual-polarized antenna according to claim 1, wherein the first phase-shifting structure and the second phase-shifting structure are phase-fixed shifters, and phase-shifting degrees of the first phase-shifting structure and the second phase-shifting structure are different.

10. The dual-polarized antenna according to claim 7, wherein the third phase-shifting structure, the first phase-shifting structure, and the second phase-shifting structure are sequentially laminated, or the third phase-shifting structure, the second phase-shifting structure, and the first phase-shifting structure are sequentially laminated.

11. The dual-polarized antenna according to claim 9, wherein a maximum phase-shifting degree of a third shifter is 360°, a phase-shifting degree of a first shifter is 90°, and a phase-shifting degree of a second shifter is 180°.

12. The dual-polarized antenna according to claim 1, wherein the first phase-shifting structure and the second phase-shifting structure are phase-tunable shifters.

13. The dual-polarized antenna according to claim 12, wherein the first phase-shifting structure comprises a fifth dielectric substrate and a sixth dielectric substrate that are opposite to each other, a third tunable dielectric layer disposed between the fifth dielectric substrate and the sixth dielectric substrate, a fifth electrode layer disposed on a side, close to the sixth dielectric substrate, of the fifth dielectric substrate, and a sixth electrode layer disposed on a side, close to the fifth dielectric substrate, of the sixth dielectric substrate; and the second phase-shifting structure comprises a third dielectric substrate and a fourth dielectric substrate that are opposite to each other, a second tunable dielectric layer disposed between the third dielectric substrate and the fourth dielectric substrate, a third electrode layer disposed on a side, close to the fourth dielectric substrate, of the third dielectric substrate, and a fourth electrode layer disposed on a side, close to the third dielectric substrate, of the fourth dielectric substrate;

wherein the third dielectric substrate and the fifth dielectric substrate are of an integrated structure, the fourth dielectric substrate and the sixth dielectric substrate are of an integrated structure, the second tunable dielectric layer and the third tunable dielectric layer are of an integrated structure, the third electrode layer and the fifth electrode layer are disposed on a same layer, and the fourth electrode layer and the sixth electrode layer are disposed on a same layer, and wherein the third phase-shifting structure is disposed on a side, facing away from the fourth dielectric substrate, of the third dielectric substrate.

14. The dual-polarized antenna according to claim 12, wherein the first phase-shifting structure comprises a fifth dielectric substrate and a sixth dielectric substrate that are opposite to each other, a third tunable dielectric layer disposed between the fifth dielectric substrate and the sixth dielectric substrate, a fifth electrode layer disposed on a side, close to the sixth dielectric substrate, of the fifth dielectric substrate, and a sixth electrode layer disposed on a side, close to the fifth dielectric substrate, of the sixth dielectric substrate; and the second phase-shifting structure comprises a third dielectric substrate and a fourth dielectric substrate that are opposite to each other, a second tunable dielectric layer disposed between the third dielectric substrate and the fourth dielectric substrate, a third electrode layer disposed on a side, close to the fourth dielectric substrate, of the third dielectric substrate, and a fourth electrode layer disposed on a side, close to the third dielectric substrate, of the fourth dielectric substrate;

wherein the fifth dielectric substrate is disposed on a side, facing away from the third dielectric substrate, of the fourth dielectric substrate, and the third phase-shifting structure is disposed on a side, facing away from the fourth dielectric substrate, of the third dielectric substrate, or wherein the third dielectric substrate is disposed on a side, facing away from the fifth dielectric substrate, of the sixth dielectric substrate, and the third phase-shifting structure is disposed on a side, facing away from the sixth dielectric substrate, of the fifth dielectric substrate.

15. The dual-polarized antenna according to claim 12, wherein a maximum phase-shifting degree of a third shifter is 360°, a maximum phase-shifting degree of a first shifter is 90°, and a maximum phase-shifting degree of a second shifter is 90°.

16. The dual-polarized antenna according to claim 1, further comprising: a feed structure electrically connected to the first phase-shifting structure.

17. The dual-polarized antenna according to claim 1, wherein the radiation structure is a radiation patch.

18. An electronic device, comprising: a dual-polarized antenna, wherein the dual-polarized antenna comprises: a radiation structure, a first feeder, a second feeder, a first phase-shifting structure, a second phase-shifting structure, and a third phase-shifting structure; wherein the first phase-shifting structure is electrically connected to the radiation structure via the first feeder, the second phase-shifting structure is electrically connected to the radiation structure via the second feeder, and a feed direction of the first feeder is different from a feed direction of the second feeder; and the first phase-shifting structure and the second phase-shifting structure both are electrically connected to the third phase-shifting structure and both are disposed on different layers with the third phase-shifting structure, and a maximum phase-shifting degree of the first phase-shifting structure and a maximum phase-shifting degree of the second phase-shifting structure both are less than a maximum phase-shifting degree of the third phase-shifting structure.

19. The electronic device according to claim 18, wherein the third phase-shifting structure comprises a first dielectric substrate and a second dielectric substrate that are opposite to each other, a first tunable dielectric layer disposed between the first dielectric substrate and the second dielectric substrate, a first electrode layer disposed on a side, close to the first tunable dielectric layer, of the first dielectric substrate, and a second electrode layer disposed on a side, close to the first tunable dielectric layer, of the second dielectric substrate, wherein the first phase-shifting structure and the second phase-shifting structure both are disposed on a side, facing away from the first dielectric substrate, of the second dielectric substrate.

20. The electronic device according to claim 18, wherein the first phase-shifting structure is a phase-fixed shifter, and the second phase-shifting structure is a phase-tunable shifter.

* * * * *